US010963873B2

(12) United States Patent
Proctor et al.

(10) Patent No.: US 10,963,873 B2
(45) Date of Patent: Mar. 30, 2021

(54) SYSTEMS AND METHODS FOR MONITORING DISTRIBUTED PAYMENT NETWORKS

(71) Applicant: MASTERCARD INTERNATIONAL INCORPORATED, Purchase, NY (US)

(72) Inventors: Michael Proctor, St. Charles, MO (US); Daniel E. Moore, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 537 days.

(21) Appl. No.: 15/487,998

(22) Filed: Apr. 14, 2017

(65) Prior Publication Data

US 2018/0300718 A1  Oct. 18, 2018

(51) Int. Cl.
*G06Q 20/40* (2012.01)
*G06Q 20/10* (2012.01)
*G06Q 20/22* (2012.01)
*G06Q 20/08* (2012.01)
*H04L 12/24* (2006.01)
*H04L 12/26* (2006.01)

(52) U.S. Cl.
CPC ............ *G06Q 20/40* (2013.01); *G06Q 20/08* (2013.01); *G06Q 20/10* (2013.01); *G06Q 20/223* (2013.01); *H04L 41/0668* (2013.01); *H04L 41/12* (2013.01); *H04L 43/0817* (2013.01); *H04L 43/0811* (2013.01)

(58) Field of Classification Search
CPC ............ G06Q 20/00; G03H 1/00; H04W 4/02
See application file for complete search history.

(56) References Cited

U.S. PATENT DOCUMENTS

2016/0019534 A1* 1/2016 Sidhu .................... G06Q 20/38
705/39
2016/0094398 A1* 3/2016 Choudhury ............. H04L 45/42
370/254

FOREIGN PATENT DOCUMENTS

WO   WO2017/027188   2/2017

\* cited by examiner

*Primary Examiner* — Scott C Anderson
*Assistant Examiner* — Marla Hudson
(74) *Attorney, Agent, or Firm* — Harness, Dickey & Pierce, P.L.C.

(57) ABSTRACT

Systems and methods are provided for use in distributing one or more services to edge devices in a payment network and for monitoring distributed processing devices associated with the payment network by a network of nodes of the payment network. One exemplary method includes receiving, at a first node of the network of nodes, a request for data from a client and identifying, by the first node, a second node as including the data. The method also includes forwarding the request for the data to the second node, and providing the data to the client, by the first node, in response to the request, upon receipt of the data from the second node, whereby the network of nodes fulfills the request for the data even when the data is included in the second node and the request is received at the first node.

13 Claims, 3 Drawing Sheets

SYSTEMS AND METHODS FOR MONITORING DISTRIBUTED PAYMENT NETWORKS

FIELD

The present disclosure generally relates to systems and methods for monitoring distributed payment networks, and in particular, to systems and methods for monitoring, by distributed networks of nodes, transaction statistics within the payment networks.

BACKGROUND

This section provides background information related to the present disclosure which is not necessarily prior art.

Payment accounts are often used to fund transactions for the purchase of products (e.g., goods and/or services) from merchants, etc. To facilitate such transactions, payment networks support communications between acquirer banks associated with the merchants and issuer banks associated with the particular payment accounts funding the transactions, to provide authorization, clearing and settlement of the transactions. The payment networks typically include interface processors (e.g., MasterCard® interface processors (MIPs), etc.), which are often disposed with the acquirer banks and issuer banks, to receive and/or provide messages to the acquirer banks and the issuer banks related to the transactions (e.g., authorization requests, authorization replies, etc.).

In connection with the above transactions and interactions, it is also known for the payment networks to provide centralized servers to monitor and/or analyze the individual interface processors and/or other edge devices within the payment networks to facilitate the communications between the acquirer banks and the issuer banks.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment networks include interface processors, which are distributed geographically and, often, are disposed with banking institutions associated with the payment networks (which are also often distributed geographically). From time to time, the interface processors may experience errors or issues, which cause the interface processors to fail and/or to continue to operate in diminished manners. By collecting and analyzing transaction statistics associated with the interface processors, or with other edge devices of the payment networks, the payment networks are able to alleviate (e.g., eliminate, reduce, etc.) such issues or errors associated with the interface processors and/or other edge devices. Uniquely, the systems and methods herein provide a distributed network of nodes, which form a mesh network over a payment network (or segment thereof). Each of the nodes communicates with one or more processing devices, often disposed at a customer location (e.g., at an issuer, at an acquirer, etc.) to collect data from the processing devices. The data collection may be scheduled, or it may be on-demand (e.g., via an application programming interface (API), etc.). In connection therewith, the nodes each may rely on shutdown processes to divert connected processing devices to other nodes, and may further provide data transformations for output summaries and/or processed data to desired users and/or applications. As such, the node network provides a distributed monitoring system for the one or more processing devices included in the payment network, which is scalable, in general, to accommodate changes in the payment network.

Figure 1:
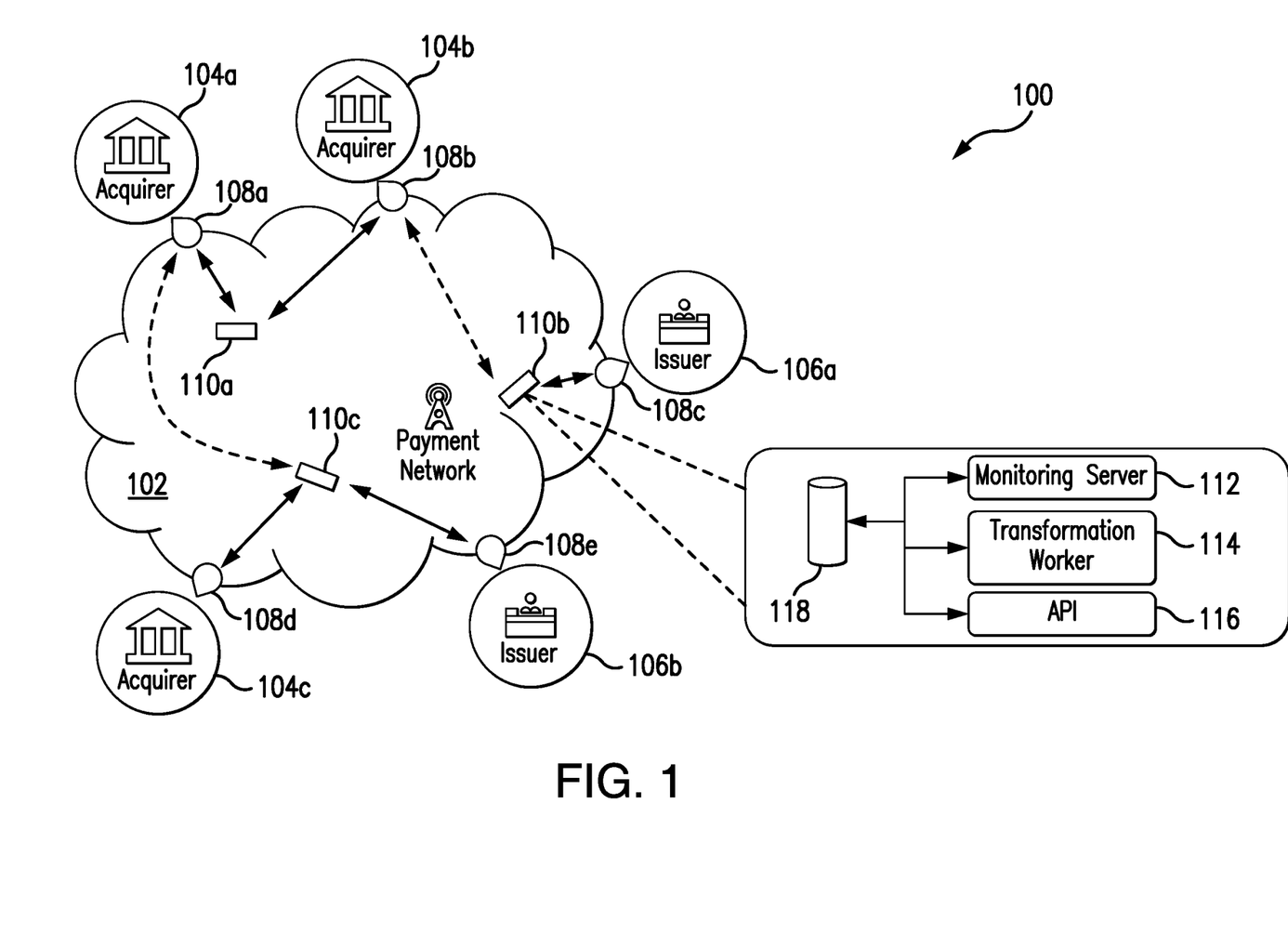
FIG. 1 is a block diagram of an exemplary system of the present disclosure suitable for use in monitoring, by a distributed network of nodes, interface processors included in a payment network.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, distribution of processing devices, distribution of nodes, services associated with payment accounts and payment account transactions, etc.

As shown in FIG. 1, the system 100 generally includes a payment network 102, three acquirers 104a-c (e.g., acquirer banks, etc.), and two issuers 106a-b (e.g., issuer banks, etc.), each coupled to (and in communication with) the payment network 102. In general, the acquirers 104a-c and the issuers 106a-b are banking institutions, which provide accounts to consumers, merchants, etc. The accounts may include, for example, credit accounts, savings accounts, prepaid accounts, debit accounts, checking accounts, etc. The accounts, then, may be used to transfer funds therebetween and/or to fund transactions for purchases of products from merchants, as described in more detail below.

In this exemplary embodiment, the payment network 102 includes multiple processing devices 108a-e. Here, specifically, the processing devices 108a-e include, for example, MasterCard® interface processors (MIPs), etc. Each of the processing devices 108a-e is disposed at an "edge" of the payment network 102 (e.g., and thus each is also referred to as an edge device, etc.) in that each connects with and/or provides communication to different ones of the acquirers 104a-c and/or the issuers 106a-b. In particular, each of the processing devices 108a-e is associated with one of the acquirers 104a-c or issuers 106a-b, such that communication with that particular ones of the acquirers 104a-c or issuers 106a-b, as related to authorization of payment transactions, for example, is coordinated therethrough. As indicated in FIG. 1, in the illustrated embodiment the acquirers 104a-c and the issuers 106a-b are distributed geographically within one or more regions and/or countries, etc. As such, the associated processing devices 108a-e are likewise distributed geographically. The processing devices 108a-e may thus, even as part of the payment network 102, be disposed across different regions or countries or continents. In this manner, operations at the processing devices 108a-e may occur within one region or country, and remain in that country or region (at least as to specific data handled thereby) to comply with certain restrictions regarding the data that may, eventually, be transmitted and/or provided to other parts of the payment network 102 (or other parts of the system 100) in one or more different regions and/or countries.

In one exemplary purchase transaction, for example, a consumer initiates a transaction with a merchant (not shown) to be funded by a payment account issued by issuer 106b (in Region B (not shown)) by presenting a corresponding payment device to the merchant (in Region A (not shown)). In turn, the merchant reads the payment device and causes an authorization request (broadly, a message) to be provided to the acquirer 104a (i.e., as a provider of the merchant's banking account), which is also situated in Region A. The acquirer 104a transmits the authorization request to the payment network 102, via interface processing device 108a. In response, the issuer 106b receives the authorization request from the payment network 102, via interface processing device 108e, and determines if the transaction is approved or declined based on a variety of factors, including, for example, a balance of the payment account, etc. When approved, the issuer 106b provides an authorization reply (broadly, a message), indicating the approval, back through the interface processing device 108e and the interface processing device 108a, to the acquirer 104a and the merchant. The merchant is then able to continue the transaction with the consumer. Alternatively, when the transaction is declined, the issuer 106a provides an authorization reply, declining the transaction, back through the payment network 102 to the acquirer 104a and the merchant. The merchant may then terminate the transaction or seek other forms of funding for the transaction.

The above is described with reference to an inter-regional transaction between Region A and Region B. And as can be appreciated, authorizing the transaction involves the exchange of data between the two regions (Regions A and B). In connection therewith, in some embodiments, the payment network 102 may be subject to regulatory constraints that require the transaction (as originating in Region B), for example, to be processed entirely within Region B, or that restrict where certain data related to the transaction may be stored. As such, the system 100 generally includes the ability to compartmentalize transaction data and/or services (e.g., authorization, etc.) relating to the transaction at the processing devices 108a, 108e (i.e., restrict its replication between sites) as needed to comply with the given regulatory constraints. For example, one or more controls around how the data is allowed to be queried from and/or exchanged within the system 100 may be imposed at particular processing devices and/or nodes receiving requests relating to the transaction, etc.

Further to the above inter-regional transaction, it should be appreciated that the present disclosure is not limited to such transactions, or for that matter is not subject only to inter-regional data restrictions. Specifically, in another exemplary transaction, for example, both the acquirer 104a and issuer 106a may be disposed in the same region (or disposed such that there are no inter-region restrictions) (e.g., both in Region A, etc.). In this example, the authorization message may be transmitted, by the payment network 102 to the issuer 106a associated with the consumer's account, such as, for example, via the interface processing device 108c. The flow of the response, then, is consistent with the flow described above.

While only three acquirers 104a-c, two issuers 106a-b, and five processing devices 108a-e are illustrated in FIG. 1 (for ease of illustration), it should be appreciated that the system 100 may include any desired number of such entities or devices within the scope of the present disclosure. In general, the system 100 will often include many more of each of these entities and/or devices.

Figure 2:
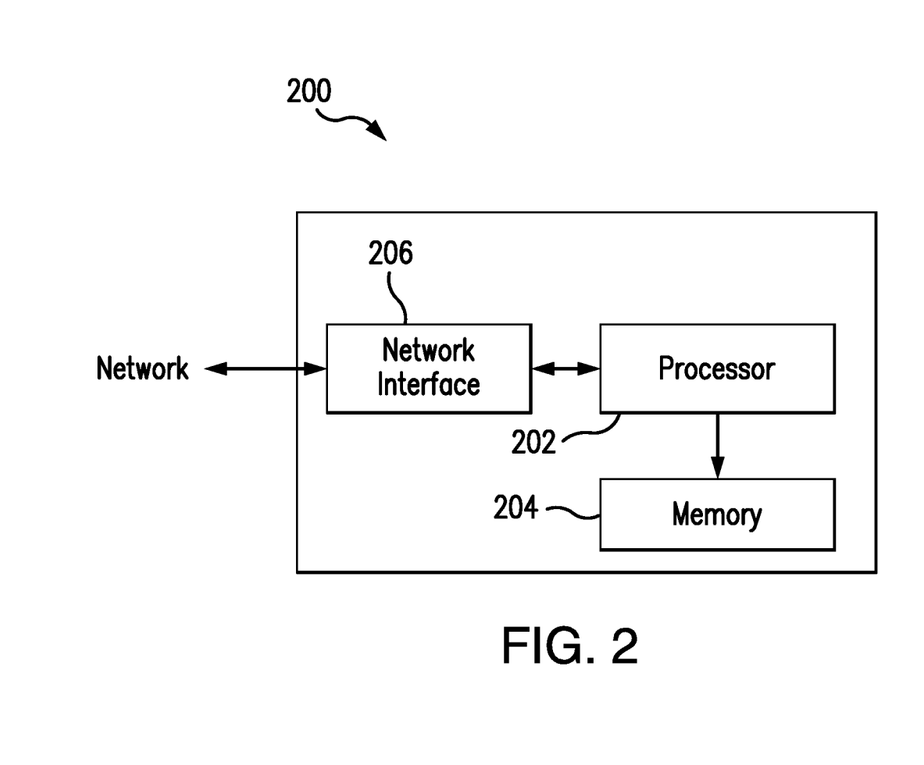
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, computers, laptops, point-of-sale (POS) devices, etc. In addition, the computing device 200 may include a single computing device, or it may include multiple computing devices located in close proximity or distributed over a geographic region, so long as the computing devices are configured to function as described herein. In the system 100, each of the acquirers 104a-c, the issuers 106a-b, and the processing devices 108a-e may include, or may be implemented in, a computing device consistent with computing device 200. In connection therewith, each is then coupled to, and is in communication with, one or more networks interconnecting these parts of the system 100. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, operational data, statistical data, analytical data, performance data, and/or other types of data (and/or data structures) suitable for use as described herein. Furthermore, in various embodiments, computer-executable instructions, i.e., software instructions, may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. In addition, one or more load files may be stored in memory 204, which include hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204) and configured to provide communication and/or coupling to one or more networks. The one or more networks may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Consistently, the network interface 206 may include, without limitation, a wired network adapter, a wireless network adapter, a mobile network adapter, or other device capable of communicating to/with the one or more different networks, for example, as included in the system 100. In some exemplary embodiments, the computing device 200 includes the processor 202 and one or more network interfaces 206 incorporated into or with the processor 202.

Referring again to FIG. 1, the payment network 102 further includes three nodes 110a-c, which are configured, by executable instructions, to monitor the processing devices 108a-e included in the payment network 102 and to operate as described herein. In connection therewith, the nodes 110a-c may each be considered a computing device consistent with the computing device 200. And, as illustrated in FIG. 1, each of the nodes 110a-c, similar to each of the processing devices 108a-e, is generally distributed in the payment network 102 to be disposed in one or more particular regions and/or countries, etc., in which one or more of the processing devices 108a-e is disposed. As such, communication between the processing devices 108a-e and the nodes 110a-c may be permitted (e.g., under regional data restrictions, etc.) and/or may be more efficient. That said, while the processing devices 108a-e may be distributed in different regions and/or countries, etc., the nodes 110 will not necessarily be distributed to those same regions and/or countries, etc. In addition, in general, the payment network 102 will include multiple processing devices 108a-e for each of the nodes 110a-c. Further, while only three nodes 110a-c are illustrated in FIG. 1 (for ease of illustration), it should be appreciated that the system 100 may include any desired number of nodes within the scope of the present disclosure. In general, the system 100 will often include many more such nodes (e.g., including a fourth node, a fifth node, a sixth node, etc.).

In the illustrated embodiment, the node 110b includes a monitoring server 112, a transformation worker 114, an API 116, and a data structure 118. It should be understood that each of the other nodes 110a, 110c may also include the same (although such similarity is not required in all embodiments).

In the system 100, each of the nodes 110a-c is configured to initially detect the other nodes 110a-c within the payment network 102. Specifically, for example, the monitoring server 112 of the node 110b is configured to determine a topology and/or arrangement of the other nodes 110a, 110c by either querying the other nodes 110a, 110c for data stored in the respective nodes 110a, 110c, by reading a listing of the nodes 110a, 110c from a data structure associated therewith, and/or by listening for inbound connections from the nodes 110a, 110c. Based on the same, the node 110a, for example, is configured to connect to each of the other nodes 110b-c and to exchange information about other known ones of the nodes 110b-c in the payment network 102. In this manner, the monitoring server 112 of the node 110b is configured to be included in a mesh network defined by the nodes 110a-c, where each of the nodes 110a-c is thus in communication with each of the other nodes 110a-c. It should be appreciated that the mesh network may include a tiered topology in some embodiments, depending on, for example, the number and/or distribution of nodes included therein. Further, in at least one embodiment, the node 110a, for example, is configured to be a "parent" node to node 110b, whereby communication from the node 110b to one or more other nodes (e.g., node 110c, etc.) is coordinated though the node 110a (as the node 110b is only connected to node 110a).

As an example, executable instructions may be defined by the code segment provided below, which when executed by the node 110b (and the other nodes 110a, 110c), cause the nodes 110a-c to form a mesh network for the nodes 110a-c. Generally, as it pertains to the code segment below, the term "peer" is generally used with reference to the other nodes 110a, 110c connected to the node 110b, the term "processor" is generally used with reference to a processing device (e.g., a MIP, etc.), and the term "client" is generally used with reference to another user or application that is requesting data about one or more of the processing devices from the node 110b, for example.

```
function joinNetwork(PeerServer[ ] seedPeers) {
    foreach (seedPeers as onePeer) {
        if (newConnection = onePeer.attemptConnection( )) {
            registerPeerConnection(newConnection);
            requestPeerTopologyData(newConnection);
        }
    }
}
function receivePeerAdvertisementFromPeer(PeerServer advertisedPeer) {
    if (newConnection = advertisedPeer.attemptConnection( )) {
        registerPeerConnection(newConnection);
        requestPeerTopologyData(newConnection);
    }
}
function shutdown( ) {
    myPeerList = getAllConnectedPeers( );
    foreach (myPeerList as onePeer) {
        notifyPeerOfShutdown(onePeer);
    }
    myProcessors = getAllConnectedProcessors( );
    foreach (myProcessors as oneProcessor) {
        suggestReconnection(oneProcessor, myPeerList);
        disconnectProcessor(oneProcessor);
    }
}
function peerConnected(PeerServer peer) {
    ConnectionObject connection = getPeerConnection(peer);
    requestPeerTopologyData(connection);
    myPeerList = getAllConnectedPeers( );
    advertisePeerToPeers(peer, myPeerList);
}
function peerDisconnected(PeerServer peer) {
    removePeerData(peer);
    myPeerList = getAllConnectedPeers( );
    broadcastPeerDisconnection(peer, myPeerList);
}
function newProcessorConnection(Processor processor) {
    advertiseNewProcessorToAllPeers(processor);
}
function receiveProcessorAdvertisementFromPeer(Processor advertisedProcessor) {
    registerProcessor(advertisedProcessor);
}
```

The monitoring server 112 of the node 110b is also configured to listen for inbound network connections from the processing devices 108a-e and to maintain a listing of the processing devices 108a-e in the payment network 102.

Specifically, for example, the monitoring server 112 is configured to monitor connect/disconnect activity of the processing devices 108a-e and to exchange advise messages with other ones of the nodes 110a, 110c, thereby indicating to the other nodes a location of all processing devices 108a-e in the payment network 102.

In addition, the monitoring server 112 of the node 110b is configured to communicate with (bi-directionally) one or more of the processing devices 108a-e in two primary exchanges: scheduled and on-demand. In the first scheduled exchange, the processing devices 108a-e are configured to provide data to the monitoring server 112, such as, for example, a total number of transactions (e.g., credit transactions, debit transactions, etc.), generally, or per defined interval (e.g., every two minutes, five minutes, an hour, etc.), according to a scheduled time. The scheduled time may be every two minutes, every hour, daily, at midnight (or some other time), or on even/odd days, or weekly, etc. In response, the monitoring server 112 is configured to receive the data, to processes it (as necessary or desired) and to store the data to the data structure 118 included in the node 110b. It should be appreciated that a variety of different types of data, defined intervals and/or schedules may be employed to capture data from the processing devices 108a-e in other embodiments, potentially, depending on, for example, a particular performance of the processing devices 108a-e that is to be measured and/or reviewed.

In connection with the on-demand exchange, the monitoring server 112 of the node 110b is configured to respond to one or more different data demands. The demands may be imposed by one or more of the processing devices 108a-e, or may be received from an entity outside the payment network 102 (e.g., a user program associated with the payment network 102 or the issuer 106a, etc.). In particular, when one of the processing devices 108a-e is experiencing an issue and/or otherwise recognizes an abnormal condition, the processing device may be configured to transmit an operational message to the node 110b (e.g., a high-priority operational message, etc.). In response, the monitoring server 112 is configured to receive the operational message, store the operational message in the data structure 118, and provide the operational message to an event management service (e.g., internal or external to the payment network 102, etc.). And, when the data demand originates from a user or program and involves a specific data request from one or more of the processing devices 108a-e, the monitoring server 112 is configured to identify the particular one of the nodes 110a-c (and its associated monitoring server) connected to the one or more processing devices 108a-e at issue, based on the topology of the mesh network understood by the monitoring server 112. Once identified, the monitoring server 112 is configured to provide the request to the appropriate one of the nodes 110a-c (and its monitoring server), which is then configured to request the appropriate data from the one or more processing devices 108a-e. In turn, when a response from the one or more of the processing devices 108a-e is received, the receiving one of the nodes 110a-c (and its corresponding monitoring server) is configured to relay the data in the reverse direction, for example, to the monitoring server 112 of node 110b, as necessary, and ultimately back to the user or program that initially requested the data. In this manner, the on-demand request for data may be provided by the requesting user or program to any known monitoring server 112 (of the appropriate one of the nodes 110a-c) in the payment network 102, but still be effective to retrieve the data sought. Also, neither the users nor the programs requesting data, nor the transaction processing devices 108a-e to which the requests are directed, needs to understand the topology of the nodes 110a-c.

As an example, executable instructions may be defined by the code segment provided below, which when executed by the node 110b (and/or the other nodes 110a, 110c), cause the node 110b to communicate one or more client requests (e.g., a request from a user or application, etc.) in connection with data demand, to the appropriate one of the other nodes 110a, 110c.

```
function receiveClientRequest(RequestObject request) {
    if (isLocalToMe(request.targetProcessor)) {
        dispatchRequest(request.command, request.targetProcessor);
    } else {
        route = buildRouteToTarget(request.requestingClient,
        request.targetProcessor);
        targetNode = route.getNextNode( );
        dispatchRequest(request, targetNode);
    }
}
function receiveResponseToClientRequest(ResponseObject response) {
    if (isLocalToMe(response.requestingClient)) {
        dispatchResponse(response);
    } else {
        route = buildRouteToTarget(response.targetProcessor,
        response.requestingClient);
        targetNode = route.getNextNode( );
        dispatchResponse(response, targetNode);
    }
}
```

With continued reference to FIG. 1, the nodes 110a-c of the payment network 102 are also configured to provide alternate connectivity to the processing devices 108a-e, when the particular one of the nodes 110a-c associated with the particular one of the processing devices 108a-e is down. In so doing, the particular one of the nodes 110a-c that is shutting down notifies the devices 108a-e of the shutdown and provides address information for another monitoring server of one of the nodes 110a-c. Specifically, for example, when the monitoring server 112 of the node 110b is shutting down, it is configured to transmit an advise message to the transaction processing device 108c connected thereto (such that the processing device 108c may then be configured to connected to one of the other nodes 110a, 110c). Similarly in this example, when the node 110a is shutting down, the monitoring server of the node 110a is configured to transmit an advise message to the processing devices 108a-b (such that the processing devices 108a-b are then configured to connect to node 110c and node 110b, respectively, as indicated by the dotted lines in FIG. 1). And, when the node 110c is shutting down, the monitoring server of the node 110c is configured to transmit an advise message to the processing devices 108d-e (such that the processing devices 108d-e may then be configured to connect to one of the other nodes 110a-b). In this way, the various processing devices 108a-e are provided the necessary information to quickly reconnect to another one of the nodes 110a-c, even if that node is not directly known to the processing devices 108a-e. In addition, the monitoring servers of the respective nodes 110a-c may be configured to utilize heuristics to decide which of the other ones of the nodes 110a-c to advise to each one of its connected transaction processing devices 108a-e in advance of shutdown. As such, the monitoring servers may be configured to attempt to distribute their current loads of corresponding ones of the processing devices 108a-e evenly, or otherwise, across the multiple other nodes 110a-c (in the same region, or not), or they may be configured to utilize the topology of the mesh network of the nodes 110*a-c* to select a proximate, near or efficient other one of the nodes 110*a-c* for each of its given processing devices 108*a-e*.

In the exemplary embodiment, the data structure 118 is illustrated as being included in the node 110*b*. But it should be understood that the data structure 118 is configured to cooperate with data structures included in the other nodes (e.g., node 110*a* and node 110*c*, etc.) to provide distributed storage within the payment network 102 as desired and/or appropriate. Specifically, for example, the data structures of the various nodes 110*a-c*, as operated and/or used by the monitoring servers of the nodes 110*a-c*, may form, for example, an Apache Cassandra™ data structure, thereby providing a unified logical storage (or data structure) for use as described herein. Alternatively, in other embodiments, the data structures of the nodes 110*a-c* may form other arrangements (e.g., MongoDB, Riak and OrientDB, etc.) and/or may include distributed NoSQL key-value data structures.

Further in the system 100, the transformation workers of the nodes 110*a-c* (e.g., the transformation worker 114 of the node 110*b*, etc.) are configured to summarize, transform, and/or otherwise process the raw data received from the respective ones of the processing devices 108*a-e* and store the data in the corresponding data structures (e.g., the data structure 118 of the node 110*b*, etc.). The transformation workers are further configured to perform routine maintenance of the data structures. For example, the transformation workers may be configured to aggregate data for multiple processing devices 108*a-e* (across multiple nodes 110*a-c*) and to calculate the instantaneous total transactions per second (TPS) being processed on the payment network 102. Also, in another example, the transformation workers may be configured to utilize current and historical data to produce future forecasts of the activity of individual processing devices 108*a-e*, which may be employed to plan for capacity purposes and/or to identify deviations from a norm indicative of issues in the payment network 102 (or at a particular one of the processing devices 108*a-e*). In yet another example, the transformation workers may be configured to produce forecasts as to all processing devices 108*a-e*, or as to groups of processing devices 108*a-e*, and/or to prune data from their corresponding data structures once a defined retention interval (e.g., one day, one week, etc.) for that data has lapsed.

In turn in the system 100, the monitoring servers of the nodes 110*a-c* are configured to initiate and/or to manage the transformation workers, and to communicate with the other monitoring servers to ensure, at least in this embodiment, that only one of the transformation workers is active at one time (within the payment network 102, or a subset thereof). In this manner, only one transformation worker is working on the data included in the various data structures (across all of the nodes 110*a-e*) to reduce and/or eliminate multi-access issues (e.g., data collisions, etc.) and/or conflicting processed data from being output from the transformation worker. In connection therewith, the given transformation worker may be active, as opposed to other transformation workers, because it is included, for example, at one of the nodes 110*a-c* with the fewest connected processing devices 108*a-e*, at one of the nodes 110*a-c* with the lowest-latency path to the data structures, at a random one of the nodes 110*a-c*, at one of the nodes 110*a-c* that has been running for the longest amount of time, etc.

It should be appreciated that in at least one embodiment, the nodes 110*a-c*, may collectively include only one transformation worker, whereby the selection of the transformation worker is eliminated and all requests, of the types described above, are routed to the node with the transformation worker.

Also, in the exemplary embodiment, the APIs of the nodes 110*a-c* (e.g., the API 116 at the node 110*b*, etc.) are configured to provide access to raw and/or summarized (or processed) data to users and/or user programs or applications (broadly, clients). Each of the APIs may include, without limitation, a web service API such as, for example, Representative State Transfer (REST) or Simple Object Access Protocol (SOAP), etc., or a data structure access mechanism (e.g., Java Database Connectivity (JDBC), Open Database Connectivity (ODBC), etc.), or a scheduled file transfer, etc. In one example user application, a network-based dashboard tool, accessible to a user at a computing device, may be configured to utilize a REST API to query summarized data for the entire payment network 102, every 30 seconds. However, it should be appreciated that other application programs or tools may be employed to call the APIs to retrieve data from the nodes 110*a-c*, as desired.

Figure 3:
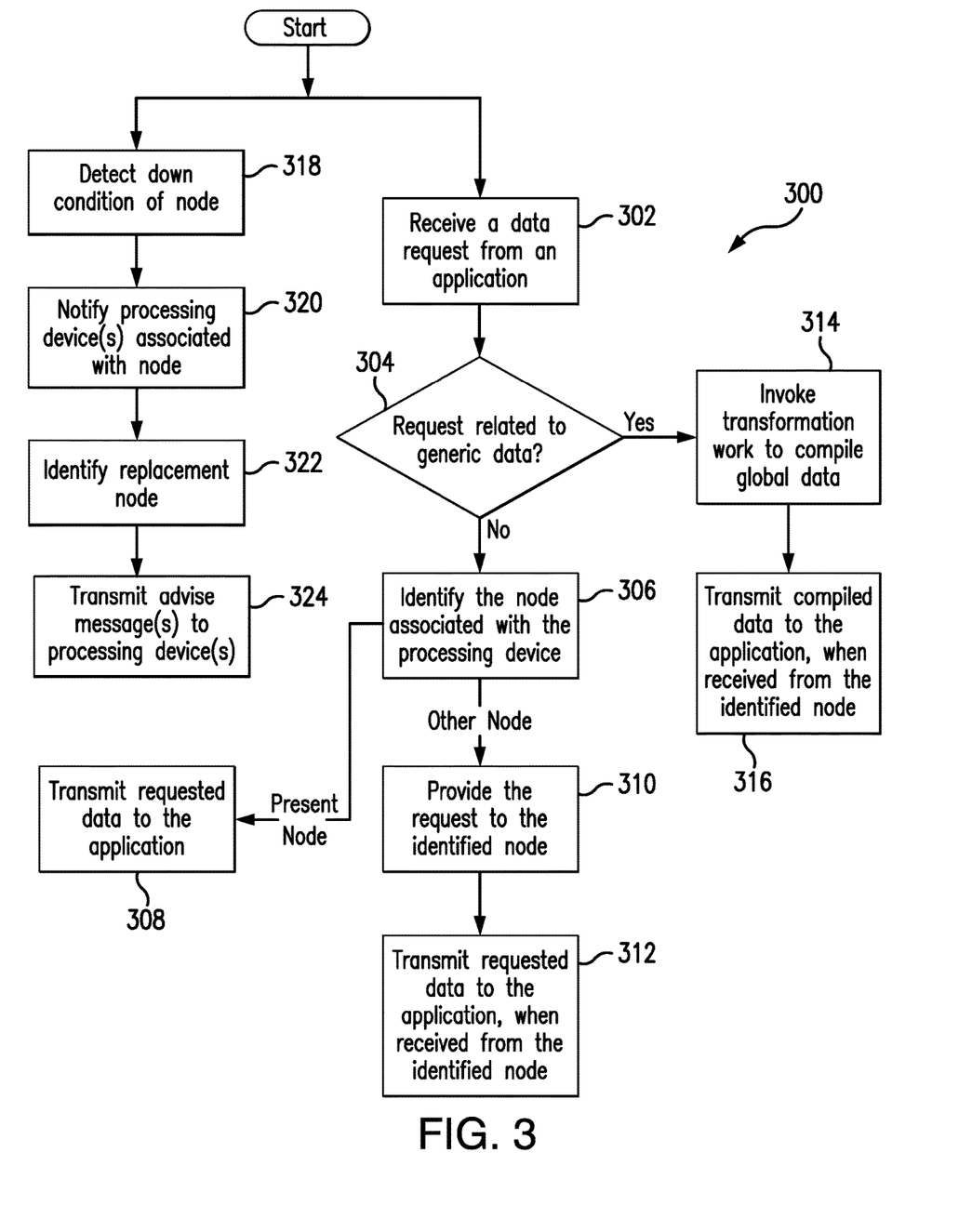
FIG. 3 is an exemplary method, which may be implemented in connection with the system of FIG. 1, for monitoring and/or collecting data related to distributed interface processors forming part of a payment network.

FIG. 3 illustrates an exemplary method 300 for use in monitoring distributed payment networks. The method 300 is described with reference to the system 100, and in particular, the processing devices 108*a-e* and the nodes 110*a-c*, and also with reference to the computing device 200. While described in this manner, however, it should be appreciated that the methods herein are not limited to the system 100 and/or the computing device 200. Likewise, it should also be appreciated that the systems and methods herein should not be understood to be limited to the method 300.

Consistent with the above, each of the nodes 110*a-c* of the payment network 102 in the system 100 continually receives and stores data in its corresponding data structure (e.g., in the data structure 118 for the node 110*b*, etc.). From time to time, a request may be provided, by a user and/or an application, included in or associated with the payment network 102, to one or more of the nodes 110*a-c*. In particular, in the example method 300 shown in FIG. 3, the request is received by the node 110*b*, at 302, from an application. The request may be received via the monitoring server 112, when provided from within the payment network 102 (i.e., when received from an application internal to the payment network 102), or it may be received through the API 116. As an example, an application internal to the payment network 102 may monitor status of processing devices 108*a-e* and make requests to one or more of the nodes 110*a-c* for data. Alternatively, the node 110*b*, or the nodes 110*a-c* collectively, may use data received unsolicited by the monitoring server(s) therein, which is then accumulated and transformed, in order to provide global statistics, health dashboards, and/or other representations of the transformed data in one or more user interactive manners, thereby, potentially, providing monitoring of the payment network 102 and, in particular, the processing devices 108*a-e*, at a given time, etc.

In response to the request in the method 300, the node 110*b* determines, at 304, if the request is related to data specific to a processing device (e.g., the processing device 108*c*, etc.), or whether the data is generic to multiple ones of the processing devices 108*a-e* (and specifically, generic to processing devices 108*a-e* associated with different nodes 110*a-c*, etc.), etc. When the data request is specific to a particular processing device (e.g., the processing device 108*c*, etc.), the node 110*b* identifies, at 306, the one(s) of the nodes 110*a-c* associated with the given processing device to which the request is directed. In this examples, if the processing device is processing device 108c, the processing device 108c is associated with the node 110b (i.e., the current or present node), and as such, the node 110b identifies itself. When the present node 110b identifies itself, the node 110b compiles the data, or retrieves the raw data form the data structure 118, as necessary, and transmits, at 308, the requested data to the user or application from which the request originated.

Conversely, when the node 110b identifies, at 306, that the processing device to which the request is directed is associated with a different one of the nodes 110a or 110c (e.g., when the request is directed to the processing device 108a, which is associated with the node 110a; etc.), the node 110b provides, at 310, the request to the identified one of the other nodes 110a or 110c (e.g., node 110a for the processing device 108a, etc.). In turn, the other one of the nodes 110a or 110c (e.g., node 110a, etc.) compiles the requested data, or retrieves the raw data form its corresponding data structure, as necessary, and returns the requested data to the node 110b. The node 110b then transmits, at 312, the requested data to the user or application from which the request originated.

With continued reference to FIG. 3, when the node 110b determines, at 304, that the request is related to data that is generic to multiple processing devices 108a-e, the node 110b invokes, at 314, the transformation worker 114 of the node 110b, which will, in turn, compile the data, as requested. For example, the transformation worker 114 may retrieve data from the other nodes 110a, 110b and aggregate the data (including the data in node 110b) and then calculate the total transactions per second per processing device (or group of processing devices), velocities of transactions per processing device (or group of processing devices), total transactions per region, etc., that are being processed on the payment network 102. Additionally, or alternatively, the transformation worker 114 may determine forecasts of the activity of individual ones of the transaction processing devices 108a-e, which may be employed in capacity planning purposes and/or for identification of deviations of processing devices' performance from certain thresholds and/or norms (e.g., as indicative of potential issues, or eminent issues, etc.), etc.

Then, once the data is compiled, at 314, by the transformation worker 114, the node 110b transmits, at 316, the requested data to the user or application from which the request originated.

It should be appreciated that the particular one of the nodes 110a-c in receipt of a given request, even when generic, may still provide the request to another one of the nodes 110a-c for handling. Specifically, for example, the monitoring servers included in several nodes 110a-c may identify a particular node based on, for example, a number of processing devices 108a-e to connected to the particular node, a lowest-latency path to the data requested, the particular node being a random one of the nodes 110a-c, a run time of the nodes 110a-c (e.g., select the longest running one of the nodes 110, etc.), etc. As an example, as shown in FIG. 1, the node 110b only has one connected processing device 108c, and as such, even when a request for data is received, at node 110b, for another processing device 108e, it still may be provided to the node 110c (consistent with 310). Thereafter, the node 110c may compile the data, as requested, and provide the data back to the node 110a, which, in turn, transmits it to the user or application from which the request originated.

Additionally (or alternatively) in the method 300, as necessary, the node 110b may provide alternate connectivity to the processing device 108c associated therewith, for example, when the node 110b is down (e.g., shuts down, etc.). In particular, the node 110b may initially detect, at 318, a down condition of the node 110b (e.g., as a planned shutdown, as an unplanned shutdown, etc.). In turn, the node 110b notifies, at 320, the device 108c of the down condition and identifies, at 322, another one of the nodes 110a, 110c in the system 100 (e.g., the monitoring server of the other one of the nodes 110a, 110c, etc.) to which the device 108c can connect when the node 110b is down. In so doing, for example, the node 110b may identify the other one of the nodes 110a, 110c based on load balancing among the nodes 110a, 110c, etc. Then, when the desired one of the other nodes 110a, 110c is identified, the node 110b transmits, at 324, an advise message to the processing device 108c and provides address information for the monitoring server, for example, of the identified other one of the nodes 110a, 110c. As such, the processing device 108c is able to quickly and efficiently reconnect to the identified one of the other nodes 110a, 110c, even if that node is not directly known to the processing device 108c (prior to receiving the advise message).

In view of the above, the systems and methods herein may provide for distributed data gathering related to payment networks, and in particular to processing devices included in and/or associated with the payment networks. In connection therewith, by relying on nodes arranged in a mesh network and/or utilizing distributing data among the nodes, the distributed data gathering may be transparent to users and/or applications requesting data therefrom and further scalable to accommodate changes in the payment network (and/or processing devices included therein). In addition, the systems and methods herein provide shutdown procedures, whereby the distributed data gathering is generally available to users and/or applications at all times. Moreover, data transformation workers of the nodes herein are configured to produce operationally relevant summaries of processed data associated with client requests in the system, as well as to: aggregate data from across different processing devices to calculate instantaneous total transactions per second (TPS) being processed on the payment networks; utilize current and historical data to produce future forecasts of the activity of individual transaction processing devices, which may be employed both for capacity planning purposes and for rapid identification of deviations from the norm that may be indicative of issues on the payment networks; produce forecasts, as above, for groups of related transaction processing devices; and/or prune data from the data structures associated with the nodes once the desired retention period for the data lapses.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) identifying, by a first node, each other node in a distributed node network; (b) receiving and storing, by the first node, raw data from multiple processing devices; (c) detecting a shutdown condition; (d) identifying, by the first node, one of multiple available replacement nodes for each of the processing devices; and (e) transmitting, by the first node, an advise message to each of the processing devices, where each message includes the identified replacement node for the processing device.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) receiving, at a first node of a network of nodes, a request for data from a client; (b) identifying, by the first node, a second node of the network as including the data; (c) forwarding the request for the data to the second node; and (d) providing the data to the client, in response to the request, upon receipt of the data from the second node, whereby the network of nodes fulfills the request for the data even when the data is included in the second node and the request is received at the first node.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in monitoring a distributed payment network, the system comprising a payment network including:

a first set of processing devices and a second set of processing devices, each processing device of the first and second sets of processing devices coupled to one of multiple institutions and configured to coordinate communication with the corresponding institution;

a first node coupled to the first set of processing devices; and a second node coupled to the second set of processing devices, and configured to coordinate with the first node to form a mesh network;

wherein the first node includes a first data structure, a transformation worker, and a monitoring server;

wherein the transformation worker of the first node is configured to:

receive raw data, associated with the communication between the first set of processing devices and the institutions corresponding to the first set of processing devices, from the first set of processing devices; and store the raw data received from the first set of processing devices in the first data structure included in the first node; and wherein the monitoring server of the first node is configured to:

detect a shutdown condition of the first node; and in response to the detection of the shutdown condition:

identify the second node as a replacement node based on a load balancing; and transmit an advise message to the first set of processing devices, the advise message including address information for the second node to divert the first set of processing devices to the second node, whereby a shutdown process is initiated for the first node prior to shutdown of the first node; and wherein the second node includes a second data structure and a transformation worker, the transformation worker of the second node configured to:
receive raw data, associated with the communication between the second set of processing devices and the institutions corresponding to the second set of processing devices, from the second set of processing devices;
store the raw data received from the second set of processing devices in the second data structure included in the second node;
compile processed data, based on the raw data stored in the first data structure and second data structure, whereby the first data structure and the second data structure form a unified logical data structure, and wherein the processed data includes a total transactions per second for at least one of the processing devices included in the first set of processing devices;
provide the processed data to a requestor;
in response to the shutdown process, receive raw data, associated with the communication between the first set of processing devices and the institutions corresponding to the first set of processing devices, from the first set of processing devices; and
store the raw data received from the first set of processing devices in the second data structure included in the second node.

2. The system of claim 1, wherein one of the first set of processing devices is configured to transmit the raw data to the first node based on a schedule.

3. The system of claim 1, wherein the payment network includes a third node and a fourth node; and
wherein the first node is configured to:
identify each of the second node and the third node;
provide information related to the identified second and third nodes to the fourth node; and
identify the second node as the replacement node based on a load balancing of the second node, the third node, and the fourth node.

4. The system of claim 1, wherein the first node is configured to:
receive a request for data associated with a processing device included in the second set of processing devices;
identify the second node based on the request;
forward the request to the second node; and
respond to the request with the requested data after the requested data is provided from the second node.

5. The system of claim 4, wherein the second node is configured to receive the request from the first node and respond with the requested data.

6. The system of claim 1, wherein the payment network further includes:
a third set of processing devices, each of the third set of processing devices coupled to one of the multiple institutions and configured to coordinate communication with the corresponding institution; and
a third node coupled to the third set of processing devices and coupled to the first node, but not coupled to the second node, wherein the third node includes a third data structure and is configured to:
receive raw data, associated with the communication between the third set of processing devices and the institutions, from the third set of processing devices;
store the raw data received from the third set of processing devices in the third data structure; and
make the stored raw data in the third data structure accessible to the second node, via the first node.

7. The system of claim 1, wherein the processed data includes a transaction total for multiple of the processing devices of the first and second sets of processing devices in the payment network.

8. The system of claim 7, wherein the second node includes an application programming interface configured to transmit the processed data to an application in response to a request from the application.

9. The system of claim 1, wherein the second node is configured to coordinate with the first node and multiple other nodes to form a mesh network; and
wherein the mesh network formed by the first node, the second node and the multiple other nodes includes a tiered mesh network.

10. The system of claim 1, wherein the second node is configured to:
receive an operational message from one of the second set of processing devices; and
transmit the operational message to an event management service.

11. The system of claim 1, wherein the monitoring server of the first node is configured to, in response to the detection of the shutdown condition, notify the first set of processing devices of the shutdown condition, prior to transmitting the advise message to the first set of processing devices.

12. A computer-implemented method for monitoring a distributed payment network, the method comprising:
receiving, by a transformation worker of a first node, from a first set of processing devices coupled to the first node, raw data associated with communication between the first set of processing devices and institutions corresponding to the first set of processing devices;
storing, by the transformation worker of the first node, the raw data received from the first set of processing devices in a first data structure included in the first node;
receiving, by a transformation worker of a second node, from a second set of processing devices coupled to the second node, raw data associated with communication between the second set of processing devices and institutions corresponding to the second set of processing devices, the second node configured to coordinate with the first node to form a mesh network;
storing, by the transformation worker of the second node, the raw data received from the second set of processing devices in a second data structure included in the second node;
compiling, by the transformation worker of the second node, processed data based on the raw data stored in the first data structure and second data structure, whereby the first data structure and the second data structure form a unified logical data structure;
providing, by the transformation worker of the second node, the processed data to a requestor;
detecting, by a monitoring server of the first node, a shutdown condition of the first node;
in response to detecting the shutdown condition:
identifying, by the monitoring server of the first node, the second node as a replacement node for the first node based on a load balancing; and
transmitting, by the monitoring server of the first node, an advise message to the first set of processing devices, the advise message including address information for the second node to divert the first set of processing devices to the second node, thereby initiating a shutdown process for the first node prior to shutdown of the first node;

in response to the shutdown process, receiving, by the transformation worker of the second node, from the first set of processing devices, raw data associated with the communication between the first set of processing devices and the institutions corresponding to the first set of processing devices; and storing, by the transformation worker of the second node, the raw data received from the first set of processing devices in the second data structure included in the second node.

13. The computer-implemented method of claim 12, further comprising, in response to the detection of the shutdown condition, notifying the first set of processing devices of the shutdown condition, prior to transmitting the advise message to the first set of processing devices.

* * * * *